J. W. W. GORDON.
Making Extracts.
No. 1,805.
Patented Oct. 8, 1840.
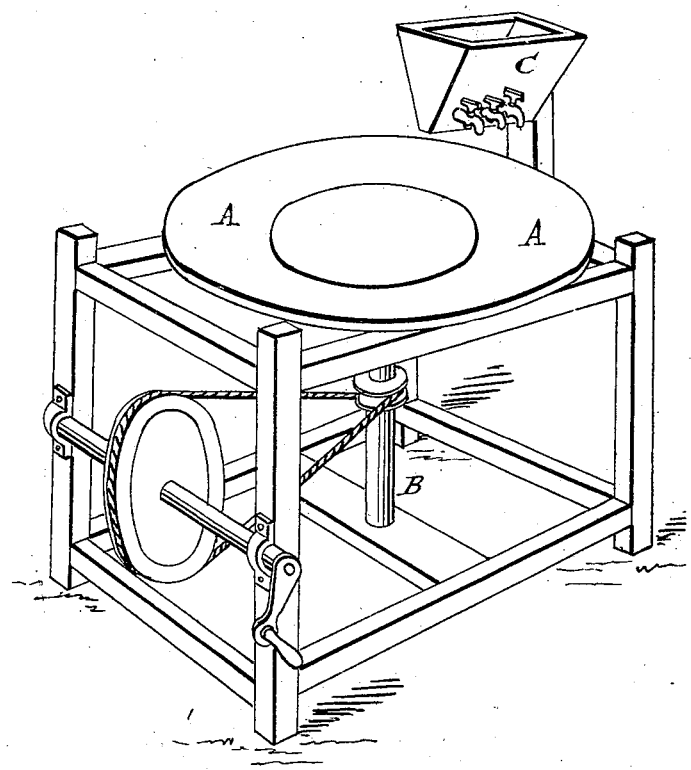

UNITED STATES PATENT OFFICE.

JAMES W. W. GORDON, OF BALTIMORE, MARYLAND.

MODE OF EVAPORATING SOLUTIONS, DECOCTIONS, &c., AND PREPARING MEDICAL EXTRACTS.

Specification of Letters Patent No. 1,805, dated October 8, 1840.

*To all whom it may concern:*

Be it known that I, JAMES W. W. GORDON, of the city of Baltimore, in the State of Maryland, have invented a new and improved manner of evaporating decoctions, infusions, or solutions for the purpose of concentrating them and of preparing extracts, by which improvement this pharmaceutical operation is rendered much more perfect than in the modes hitherto pursued; and I do hereby declare that the following is a full and exact description thereof.

The object of my improvement is, principally, to obviate the danger of injuring the preparation, which in articles of great delicacy, sometimes takes place by the application of the heat of a water, or stream, bath only; and this I effect by means of a machine which produces rapid evaporation at the ordinary temperature of the atmosphere. The accompanying drawing is a perspective representation of this machine.

A, A, is a revolving table, which may be made of close grained wood, of metal, stoneware, or any other suitable material. Its upper surface may be flat, but I prefer to make it dishing, or concave. This table may be placed horizontally, verticaly, or otherwise, and it may be made from three to six feet in diameter, more or less. It is fixed upon a shaft B, and may be made to revolve by means of whirls and bands, as shown in the drawings. The decoction, or other fluid to be evaporated, is put into any suitable receptacle, as shown at C, and from this it is allowed to drop from cocks, or through small openings of any kind duly regulated, so as to fall, and be spread upon, the table while it is in rapid motion. I most commonly employ a piece of cloth, a skein of thread, or some analogous material, down which the fluid may percolate, and by which it may be spread upon the table. In this way I have found that the evaporation goes on more rapidly than in the ordinary steam, or water, bath; that there is no danger whatever of throwing the fluid from the table by centrifugal force, and that the extract obtained is more beautiful in color, and better in all its essential properties, than when made by heat. I have used such a table in a vertical position, and have not found any more tendency in the fluid to fly off, in this case, than when the machine was placed horizontally.

Having thus, fully described the nature of my invention, and shown the manner in which I carry the same into operation, what I claim therein, and desire to secure by Letters Patent, is—

The employment of a revolving table, constructed and operating substantially in the manner of that herein described, for the evaporating of decoctions, infusions, or solutions, and the producing of pharmaceutical extracts without artificial heat, as fully described and made know in the foregoing specification thereof.

In testimony whereof I hereunto set my name, this ninth day of September, 1840.

JAS. W. W. GORDON.

Witnesses:
    THOS. P. JONES,
    W. THOMPSON.